Patented Sept. 15, 1936

2,054,623

UNITED STATES PATENT OFFICE 2,054,623

MEAT CURING MASS AND MANUFACTURE THEREOF

Enoch L. Griffith, Chicago, Ill., assignor to The Griffith Laboratories, Inc., Chicago, Ill., a corporation of Illinois No Drawing. Application October 30, 1934, Serial No. 750,708

10 Claims. (Cl. 99—222)

The present invention relates to curing salt for treating meat and the like, to the process of curing such material, and to methods of making such salt.

Since ancient times sodium chloride has been used as a meat preservative. Long ago it became known that nitrate of sodium or potassium in addition to salt, was beneficial. In particular the mixture reddened the meat and its color and appearance was better. It then became known that nitrate alone was of value individually in improving the color and appearance of meat. Subsequently it was discovered that the effectiveness of nitrate was due to nitrate being changed to nitrite, and it was also learned that the nitrite itself was changed into nitrous acid, which is the effective agent in producing a red color by union with hemoglobin of blood to form what is termed NO-hemoglobin.

It therefore became a practice to use both nitrate and nitrite with or without sodium chloride. For many years these combinations were produced by mixing the ground crystals of the respective salts. Such combinations have two types of disadvantages. The first is in respect to the constancy or uniformity of composition in a mechanical mixture. The second is in respect to the action of the mixture in the dry salt process of curing. These disadvantages are of great importance in commerce in the curing salt, and in the packing industry in curing meats.

The use of nitrates and nitrites in curing meats is regulated by law in most civilized states because of physiological detriment from intentional or accidental use of an excess. The nitrite is the one most particularly objected to, and in some countries its use is prohibited. In the United States, as in other countries, much discredit has been thrown upon mechanical mixtures of any of the suitable salts of chloride, nitrate, and nitrite. However uniformly the separate ingredients may be mixed by mechanical means, the subsequent disturbance of the mixture (as in handling, packing, shipping, etc.) causes a separation or concentration of one or more ingredients. Thus a bulk mass of the mixture remote in time or space from the mixing mill, may exhibit a non-homogeneous composition, one particular disadvantage being that it is possible innocently to use a mixture exceeding the legal limits for nitrate or nitrite. There are many instances where the United States governmental bureaus have complained of this very effect, where the salt mixture is made at one place and is shipped to another. Excess of nitrite has been a particular ground of objection.

The foregoing changes in composition also give the packer trouble, because the curing salt, for example from the top of a barrel, is different from the curing salt at the bottom of a barrel, and the packers' process or product from the respective portions of the barrel may be different, whether he uses the salt in a wet pickle or in a dry pickle.

The second disadvantage lies in the action of the curing salt on the meat. The individual salt components have different speeds of penetration and different effects on the color and form of the tissues. Sodium chloride is relatively slow in its progress into meat and the like. Nitrate is faster, but nitrite is still very much faster. Where these salts or any two of them, are together as separate crystals on a meat surface, it follows that from each crystal the salt moves at different speeds into the meat. These salts on entering the meat have different effects on the tissues of the meat. Nitrite in particular opens the pores of the meat to permit exudation of the spoilable juices in the meat, and to promote entry of nitrite. This release of meat fluids must not be so fast that it washes away the dry salt on the surface. It is therefore important where nitrite is used to minimize its sole effect with resulting quick penetration and action on the meat. The nitrate alone has a constricting effect on the pores of the meat, and therefore its sole effect is not particularly objected to. By combining the two a control of penetration may be effected, where absence of nitrite alone is maintained.

The present invention aims to overcome or minimize these disadvantages in a practical way.

One object of the invention is to provide a salt mass or curing unit in which there are on the average no individual grains or particles of the mass which are nitrite crystals or particles.

Another object of the invention is to provide a salt mass or curing unit in which, on the average, the grains or particles are each a complex grain containing both nitrate and nitrite in solid solution.

Still another object of the invention is to provide a salt mass in which, on the average the grains or particles are each a complex grain containing sodium chloride, a nitrite and a nitrate, and which may have sodium chloride in predominant quantity, and also one in which a quantity of sodium chloride may be included in the solid solution with nitrite and nitrate.

A further object of the invention is the provision of a salt mass in which the average particle is a grain of sodium chloride within which is housed the nitrate and the nitrite in solid solution.

Still another object of the invention is the provision of processes for making salt grains of the character above specified.

Still another object of the invention is the provision of a process for producing the desired salt unit by quickly evaporating water from a solution of the desired salt ingredients.

Another object of the invention is the provision of a process for producing the desired salt by fusing and chilling the desired ingredients.

Still another object is the treatment of meat in a dry curing process by use of a salt mass substantially lacking individual grains essentially consisting of nitrite and having grains or particles which comprise both nitrite and nitrate, or which comprise nitrate, nitrite and sodium chloride.

Still another object of the invention is the treating of meat in a dry curing process by use of a salt mass substantially lacking individual grains containing nitrite and no nitrate, and having grains including both nitrite and nitrate.

Another object of the invention is the use of water in small amount as a component in making a solid solution of nitrite and nitrate, the water serving to lower the fusion point below that of the same composition minus the water.

Various other and ancillary objects and advantages of the invention will be apparent from the following description and explanation of the various phases of the invention.

In carrying out the dry salt process of curing meats it is the aim to avoid the action generally or locally of nitrite undiluted with nitrate. To accomplish this it is of course necessary to employ grains or particles which contain both soluble nitrite and soluble nitrate. It is immaterial to the action of the nitrate or nitrite, what metal is employed in the nitrate and nitrite salt, but it is most common to use sodium or potassium. It is therefore not intended herein to limit the invention to sodium and potassium.

Such grains containing both nitrate and nitrite may be made in various ways and herein I have illustrated two methods of which the preferred one is described in detail in my copending applications Serial No. 671,644, filed May 18, 1933, and Serial No. 723,226, filed April 30, 1934, of which two applications the present application is a continuation in part. Matter disclosed herein and not claimed is claimed specifically in said application, Serial No. 723,226, filed April 30, 1934, and in my later applications Serial No. 39,258 and Serial No. 39,259, both filed September 5, 1935, as continuations in part of this application and of said earlier applications.

Broadly the two processes comprise forming a liquid in which the nitrate salt and the nitrite salt are homogeneously distributed, with or without the presence of other ingredients, such as sodium chloride, or water. Such liquid is then suitably treated to convert it into a solid form of a composition containing both the nitrate and nitrite. In one process the nitrate and nitrite are present in a fused mass, which may or may not contain other material dissolved in the fusion such as sodium chloride. The melt is then fixed, by allowing it to solidify in such a way as to prevent crystallization. This may be done by cooling it quickly for the purpose. Cooling may be effected by converting the smelt in a thin layer, spray or film, which forms cool quickly and provide the solid homogeneous form.

The second and preferred process is one in which the liquid form is in water solution containing the nitrate and nitrite, with or without other substance such as sodium chloride. The liquid is then fixed in much the same way as the melt, by converting it into a thin layer, spray or film, while hot, under conditions which quickly evaporate the water and fix the solids without separation by fractional crystallization.

In the fusion process the chilled product may be coarse, or even a solid cake, requiring subsequent grinding to make a powder form. The fused mass or powder from the fused mass is slow to dissolve as is customary with chilled fused salts. It is likely also to be internally stressed and subject to future crystallization into one or more of the separate ingredients. Aside from the problems of making the fused form, the product of the fusion process is less satisfactory than the product of the evaporation process, for many reasons appearing hereinafter.

Where the product results from quick evaporation, the product is a fluffy powder which easily dissolves. Its softness, fine grain and quick solubility make it more satisfactory as a curing salt. Where there is about 80% or more of sodium chloride in the solids of the aqueous solution, the product of evaporation exhibits the advantageous effect that a jacket of sodium chloride houses the mixed nitrate and nitrite. Such a salt form provides the assurance that in curing meat with it, the nitrite and nitrate never contact the meat without the presence of sodium chloride.

One effect of strong nitrite on the meat is known as burning, and one effect of strong nitrate is a bitterness in the meat. Where nitrite and nitrate are used together in the forms of this invention the bitterness from nitrate is not found, and the burning of nitrite is avoided. The cure combines the speed features of nitrite and the slow features of nitrate, without the disadvantages of each.

The presence of sodium chloride in the curing unit containing nitrite and nitrate is highly beneficial in limiting the concentration of nitrite and nitrate. It is a diluent which is effective immediately upon contact of nitrite and nitrate with the meat. The greater the content of sodium chloride, the more effective is the diluent. For this reason also, the evaporation process is preferred in making the curing unit. By it, the content of sodium chloride can more easily be made high, than by use of the fusion process.

In the fusion process, the temperature must be increased as the sodium chloride content is raised, and at practical operating temperatures it is not possible to include any large quantity of sodium chloride.

It is therefore a feature of the invention that where a high content of sodium chloride is desired in the curing unit the evaporative process is preferred, and that where no, or a low, content of sodium chloride is desired in the curing unit, the fusion process is preferred.

*The evaporation process*

The details of this process are more particularly described and claimed in my copending application Serial No. 723,226, filed April 30, 1934, which is a continuation of my application Serial No. 671,644, filed May 18, 1933, and which is a development under the Seifert Patent No. 1,950,459 issued March 13, 1934. A strong solution containing sodium chloride, sodium or potassium nitrate, and sodium or potassium nitrite, is splashed or otherwise spread into a thin film on a heated revolving roll at a high temperature, such as 140° C. to 160° C. This quickly evaporates the water, leaving a fine soft powder of apparently non-crystalline form, which falls from the roll, or which may be scraped off. Under the microscope the particles are seen to be crystalline with heart-like centers. Under polarized light in a microscope it is manifest that the heart-like centers are the united nitrite and nitrate and the jacket is largely sodium chloride.

By X-ray analysis it has been determined that the lattice of the sodium chloride may contain nitrite, nitrate, and potassium.

Experience has shown that when the dissolved salts of the solution contain about 80% or over of sodium chloride, all the 20%, which may include the nitrite and nitrate, is included in a sodium chloride jacket. Where less than 80% of sodium chloride is employed it is increasingly difficult to secure 100% inclusion (meaning that 100% of the original non-sodium chloride components is housed inside of a crystal of sodium chloride jacket). The non-included nitrite-nitrate appears by X-ray analysis to be the same united form as the heart-like centers of united nitrite and nitrate. Using from 70% to 80% sodium chloride experience has shown that the inclusion is about 70% to 80%.

Where 100% inclusion is readily obtainable there is no necessity to add a binding agent, but where it is difficult to obtain 100% inclusion a binding agent may be present in the solution to be dried, such as starch, gum, gelatin and like colloidal matter. This aids in uniting into one particle all the material, especially causing the part which is with difficulty to be included, to be bound to the other material.

The binding material is to be distinguished from a hygroscopic agent which may be used to prevent caking of the powder as disclosed in said prior application Serial No. 723,226. Therein it is described that the crystal jackets of sodium chloride as made are unstable and contain included water which is released on aging of the crystals. The use of a hygroscopic agent in the original solution provides an insulating substance between the ultimate grains, which absorbs the released water and avoids caking of the grains. Where corn sugar is employed as a hygroscopic agent it is found that a slight acidity develops in the mass, through some uncertain reaction. The slight acidity is effective to release a small amount of nitrous acid, and after a time, this can be detected by its odor. The nitrous acid formed is changed on long standing to nitrate. The moisture held by the hygroscopic agent serves to retain nitrous acid in solution in the powder mass. What the packers call "aged pickle" contains free nitrous acid, and nitrite. Hence the salt mass containing nitrite and free nitrous acid is acceptable to the packers as an aged pickle in dry form. However, from a commercial standpoint a non-acid-producing composition is desired, since it assures an unvarying ratio between nitrite and nitrate.

As an example of a solution which may be evaported into a salt mass the following is given:

| | Parts |
|---|---|
| Sodium chloride | 88 |
| Sodium nitrite | 10 |
| Sodium nitrate | 2 to 2½ |
| Other material | 2½ |

The "other material" may be omitted, or it may be the hygroscopic agent or binder, as above described.

Another example is:

| | Parts |
|---|---|
| Sodium chloride | 90 |
| Sodium nitrite | 6 |
| Sodium nitrate | 4 |

(1% to 2% of hygroscopic agent may be added)

Still another example is:

| | Parts |
|---|---|
| Sodium chloride | 80 |
| Sodium nitrite | 12 |
| Sodium nitrate | 8 |

(1% to 2% hygroscopic agent may be added)

The last two examples have a ratio of 60% nitrite to 40% nitrate, which ratio has been found very satisfactory for general use in dry salting cures according to the present invention. The evaporative process may be practiced without use of sodium chloride, and using nitrite and nitrate to provide a united combination of the two, as will later be described.

*The fusion process*

The nitrite and nitrate are intimately associated in the molten state rather than in the solution state. In the absence of reducing agents, particularly metals or organic matter, fused sodium or potassium nitrate at low temperatures is stable, and with reducing agents it breaks down into nitrites. Nitrites of sodium or potassium also may be fused and are fairly stable. It has been demonstrated that a given mixture of nitrite and nitrate can be repeatedly fused and chilled, say for about six times, with exposure to air while fused, with the result that nitrite decreases and nitrate increases. Therefore, in working to maintain original proportions, reducing action must be avoided, and prolonged exposure to oxidation by air should be avoided. Rapid action, as on hot rolls is therefore advantageous. The salts have reported melting points as follows:

| | |
|---|---|
| Potassium nitrate | 337° C. |
| Potassium nitrite | 297.5° C. |
| Sodium nitrate | 308° C. |
| Sodium nitrite | 271° C. |

It is of course well known that mixtures of pure substances may melt lower than each pure substance alone, and will melt lower than the highest melting point. Consequently mixtures of nitrite and nitrate of the alkali metals sodium and potassium melt at temperatures lower than the melting point of the nitrate. Accordingly there is little danger of decomposition of the nitrate when making mixtures of nitrite and nitrate, if reducing agents are avoided, and little danger of oxidation of nitrite, if the exposure to air while fused, is not prolonged.

Sodium chloride, however, melts at a very high temperature, near 804° C. It is not practical to make a curing unit containing nitrite and nitrate and a high content of sodium chloride, such as may readily be made by the evaporative process. The heat required to fuse all the ingredients is too high and leads to substantial destruction of the nitrite which changes the original ratio of nitrite to nitrate. This action renders the composition variable and not subject to accurate control. Likewise, the tendency for sodium chloride to crystallize out is great, and a homogeneous product is not assured on quick cooling of the fused melt. However, at lower temperatures where nitrite and nitrate predominate, the fused mass will dissolve a moderate amount of sodium chloride, which can be maintained in solid solution. As much as approximately 5% of the final mass may be sodium chloride, where 60% of the solvent mass is sodium nitrite and 40% of the solvent mass is sodium nitrate, and the temperature is 270° C.

The fused mixture is of course agitated or stirred so that it is uniform in composition, limiting the exposure to air to avoid change in composition. While the fused mass is in its homogeneous fused state it is fixed by quick cooling to the setting point. It may be converted into a spray, thin layer, film, or other form with high specific surface to effect the necessary quick cooling. It may be poured upon a cooler surface to form a solid mass before fractional crystallization takes place. The mass when cold may be ground to a powder.

In carrying out the fusion process the nitrite and nitrate (preferably of sodium) may be mixed and then heated. As soon as some portion of the mixture melts the melted portion will have a lower melting point than the highest melting constituents and the fused mass will then dissolve additional material. Where the preferred proportion of 60% sodium nitrite and 40% sodium nitrate is used the mixture has a melting point at about 230° C. A batch of fused mixture at this concentration may be used to receive, gradually, mixed salts in the same proportion and the temperature of the mass kept low and near its melting point. A part of this may then be chilled by pouring it onto a cool surface, such as an iron plate, and a part may be preserved in fused form to receive additional mixed salts in the same proportion. This practice facilitates transmission of heat to the mixed solid salts, and is economical of heat in the process. Where different proportions of mixed nitrites and nitrates, with or without sodium chloride are used, the same procedure may be adopted. Where sodium chloride is to be added, it is preferred to melt the mass containing the nitrite and nitrate, and then sprinkle in the sodium chloride with stirring.

The use of sodium salts of both nitrate and nitrite is not so advantageous as the use of different metal bases for the two salts. Where there are two metal bases in the fusion the melting point is lower, as illustrated by the following examples:

Case A

| | Percent |
|---|---|
| Sodium nitrite | 60 |
| Sodium nitrate | 40 |

Melting point about 230° C.

Case B

| | Percent |
|---|---|
| Sodium nitrite | 60 |
| Potassium nitrate | 40 |

Begins to melt at 126° C. and is completely liquid and transparent at 156° C.

Case C

| | Percent |
|---|---|
| Potassium nitrite | 60 |
| Sodium nitrate | 40 |

Begins to fuse at 139° C. and is completely liquid and transparent at 172° C.

It is believed that the difference in temperature from the beginning of liquefaction to the final complete melting is due to a shift of the ions of sodium, potassium, nitrite and nitrate to an equilibrium condition for the prevailing temperature of the mass. It is only a matter of routine experiment to test the entire range of composition of the materials in cases A, B and C to select that composition which has the lowest melting point, where it is desired to be most economical in the use of heat. Any of these compositions may be altered by various proportions of sodium chloride in order to determine the lowest temperature possible and the composition of a mixture of sodium chloride, nitrite and nitrate with the proper choice of sodium, potassium, or even other metals as metal bases for the nitrite and nitrate.

If desired the ingredients to be fused, such as 3 parts of sodium nitrite and 2 parts of sodium nitrate, may be first dissolved in water. The solution may be evaporated in open pan or on the heated rolls above described. The product may then be fused, and while molten may be poured in a thin film on a cold surface.

The product

By either process there is obtained a grain or particle which includes nitrite and nitrate together. The product is normally used in curing meat in small proportion to meat, with sodium chloride in larger proportion. The combined nitrite and nitrate are ordinarily used in amounts of about ¼ oz. to 100 lbs. of meat. This small amount cannot easily be applied to meat and it is diluted with about 3 lbs. of salt which also aids in the curing process. By the evaporative process using sodium chloride the active curing agent (nitrite-nitrate) is provided in the form of microscopic units within the tiny sodium chloride grains of the product. The fusion product on the other hand must be provided in ground form, and must be mixed in the ordinary practice with common salt in the proportion of ¼ oz. of fused product to 3 lbs. of sodium chloride. This product provides a mechanical mixture of two different types or forms of grains, whereas the jacketed product of the evaporative process employing sodium chloride, when mixed with sodium chloride, provides a mixture of essentially sodium chloride grains. The preferred practice according to this invention is to provide salt grains which contain in 2 to 4 ozs. thereof, about ¼ oz. of nitrite-nitrate combination. This product provides for more readily manipulating the small quantity of nitrite-nitrate in weighing, handling and mixing as compared to the same operations employing the ¼ oz. of fused product when the mass is mixed with the 3 lbs. of salt. In the evaporation process the first dilution with sodium chloride and the fine grain structure are automatcially provided in the process, and to produce the same result employing the fusion process, the fused product must be ground and then diluted with salt by mechanical mixing, thereby providing an unsafe mechanical mixture which is avoided by the preferred use of the evaporative process employing sodium chloride.

The curing process

In order to give an example of curing meat, for example hams, the following ingredients are set forth for use with six 16 lb. hams (7 kilo-hams):

| | Grams |
|---|---|
| Sodium chloride | 1688 |
| Sugar | 100 |
| Sodium nitrite | 10 |
| Sodium nitrate | 2 to 2½ |

In order to avoid having nitrite undiluted with nitrate, the nitrite and nitrate are combined into one product by one of the processes of this invention, with or without some or all of the sodium chloride.

By the evaporative process the formula may be:

| | Grams |
|---|---|
| Sodium chloride | 1600 |
| Sugar | 100 |
| Salt mass | 100 |

Comprising:

| | Percent |
|---|---|
| Sodium chloride | 88 |
| Sodium nitrite | 10 |
| Sodium nitrate | 2 |

By the fusion process, the formula may be:

| | Grams |
|---|---|
| Sodium chloride | 1688 |
| Sugar | 100 |
| Salt mass | 12 |

Comprising:

| | Percent |
|---|---|
| Sodium nitrite | 83.3 |
| Sodium nitrate | 16.7 |

Another example employing the preferred proportion of 60% nitrite and 40% nitrate is:

| | Grams |
|---|---|
| Sodium chloride | 2080 |
| Sugar (optional) | 125 |
| Potassium or sodium nitrite | 12 |
| Sodium nitrate | 8 |

In accordance with this invention the nitrite and nitrate are combined by the evaporative process, with or without salt, or by the fusion process.

By the evaporative process the formula may be:

| | Grams |
|---|---|
| Sodium chloride | 2000 |
| Sugar (optional) | 125 |
| Salt mass | 100 |

Comprising:

| | Percent |
|---|---|
| Sodium chloride | 80 |
| Potassium or sodium nitrite | 12 |
| Sodium nitrate | 8 | or, if no sodium chloride is used in the process,

| | Grams |
|---|---|
| Sodium chloride | 2080 |
| Sugar (optional) | 125 |
| Salt mass | 20 |

Comprising:

| | Percent |
|---|---|
| Sodium or potassium nitrite | 60 |
| Sodium nitrate | 40 |

By the fusion process, the formula will duplicate that immediately above given when no sodium chloride is used in the fusion.

In each case where meat is cured by the present invention there is absence of pure nitrite units or nitrate units which do not also contain nitrate units. The nitrite alone works too fast on the meat, dilating the capillaries to disadvantage. The nitrate has a constricting effect on the capillaries. By causing the two to act together a control of penetration is effected. The speed features of nitrite, and the slow features of nitrate are utilized and compromised. The nitrite and the nitrate act differently in coloring the meat. Where these are separate in the composition the coloring effect is not uniform, but where they are used together, uniformity results. The salt mass is a perfect curing unit, and in its preferred form having a high sodium chloride content, as well as in any form having nitrite, nitrate and sodium chloride, it contains in one unit or grain, all the curing substances. In the preferred form it may be made to contain all the curing substances in the required proportion for direct application to the meat. Use of the product assures a safe fast cure. The meat is sweeter than where nitrite is used undiluted with nitrate. There is no "burning" from direct action of nitrite. The meat does not exhibit the bitterness which is caused by the action of nitrate alone, or nitrate undiluted with nitrite. There is a lasting bloom on the lean of the meats, and a uniform coloration throughout. It gives to the dry curing process the distinctive advantages of the wet curing process, and eliminates the loss of flavor which ordinarily goes into a wet pickle. The salt mass is distinct from nitrate and from nitrite. It is not nitrate, and it is not nitrite, and it is not like a mechanical mixture of nitrate and nitrite. The salt mass in fact is a wet pickle, fixed by the process into a dry solid form. The mass of particles is homogeneous in composition. The product of the evaporative process is light, soft and flaky, not visibly crystalline, and dissolves like snow. It lacks the sizable rocky grains of the ground and mechanically mixed crystalline salts of sodium chloride, nitrite and nitrate, and the rocky form of the fused product.

*Relation of the processes and products*

The above description refers to the evaporative process and the fusion process, but these terms do not indicate that they are unrelated processes. The terms are predicated upon the outstanding step of the process. I am fully aware that fusion occurs in the evaporative process with or without the sodium chloride. For example, when a strong or concentrated solution containing only dissolved

| | Percent | |
|---|---|---|
| Sodium nitrite | 60 | } sodium chloride absent |
| Sodium nitrate | 40 | | or one containing 28% of dissolved

| | Percent | |
|---|---|---|
| Potassium nitrite | 60 | } sodium chloride absent |
| Sodium nitrate | 40 | | is spread into a thin layer on a heated surface or roll at about 140° C. to 160° C., the mass loses water and is removed therefrom in a fused cake form as distinguished from crystals obtained by evaporating a solution. On the roll it is visibly fused and of syrupy consistency, and where it is scraped off with a knife (which is of course colder) it forms a solid amorphous cake of the combined nitrite and nitrate. One of the remarkable points about the evaporative process is that it permits of a low fusion point for a mixture containing nitrite and nitrate, which is many degrees below the fusion point of mixed dry salts of nitrite and nitrate.

The difference is perhaps explainable by some role performed by the water in the original solution. At the high temperature of the roll or surface, it is perhaps possible that residual water enters as one component in a fusion comprising water, nitrite and nitrate. It is also possible that some transient or permanent combination between two or three of these ingredients has a low melting point or functions to lower the melting point of the whole. It is not to be assumed that the above suggestions commit the applicant to any particular theory. The facts are that fusion has been observed at this unexpected low temperature.

The above described fusion process resulting from evaporating a solution in thin film upon a heated surface, especially in roll form, is not as desirable as that modification of the process which consists in adding sodium chloride to the solution. The caky form of the product without sodium chloride is not commercially comparable as a curing salt to the granular form containing sodium chloride.

When a large amount of sodium chloride is also present in the solution which contains the nitrite and nitrate, the process is effective to prevent the nitrite-nitrate combination forming a cake. Rather, it effects breaking up the nitrite-nitrate combination into tiny particles or globules which are surrounded with a mass of substantially sodium chloride in a crystal form.

It is possible that the fusion mass of nitrite-nitrate is present as a dispersion in a supersaturated solution of sodium chloride, causing the sodium chloride to crystallize about the dispersed bodies as nuclei for crystallization. This theory however is not to be accepted as the statement of facts, because experts on crystallization phenomena have not been able to explain the situation to their own satisfaction.

It is therefore apparent that in the salt mass of this invention there is provided a combination of nitrite and nitrate, and a wet and a dry process of uniting nitrite and nitrate by fusion.

From the foregoing description and explanation it can readily be appreciated that the invention can be practiced within a wide range of compositions and materials without departing from the spirit and scope of the appended claims.

I claim:

1. The method of preparing a compound particularly intended for the treatment of meat which comprises forming a mixture of a nitrite and a nitrate selected from the group consisting of sodium and potassium, melting the mixture and then suddenly cooling the mixture without substantial crystallization.

2. The method of preparing a compound particularly intended for the treatment of meat which comprises forming a mixture of sodium nitrite and sodium nitrate, melting the mixture while stirring and then suddenly cooling the mixture by pouring it upon a cold surface.

3. The method of preparing a compound particularly intended for the treatment of meat which comprises forming a mixture of substantially 1½ parts by weight of sodium nitrite and 1 part of sodium nitrate, melting the mixture while stirring, suddenly cooling the mixture by pouring the same on a surface sufficiently cold to solidify the mixture without substantial crystallization and then pulverizing the compound.

4. The method of preparing a compound particularly intended for the treatment of meat which comprises forming a mixture of substantially 1½ parts by weight of sodium nitrite and 1 part of sodium nitrate, melting the mixture while stirring and then pouring the mixture on a surface sufficiently cold to prevent substantial crystallization.

5. The method of preparing a compound particularly intended for the treatment of meat which comprises forming a mixture of substantially 1½ parts by weight of sodium nitrite and 1 part of sodium nitrate, melting the mixture while stirring, sprinkling over the surface of the mixture sodium chloride, maintaining the temperature above the melting point until the sodium chloride is completely in solution and then suddenly cooling the mixture by pouring it upon a surface sufficiently cold to prevent substantial crystallization.

6. The method of preparing a compound particularly intended for the treatment of meat which comprises fusing a mixture of sodium nitrite and sodium nitrate, adding only sufficient sodium chloride to dissolve in the fused mixture, maintaining the temperature above the melting point until the sodium chloride is completely in solution and then suddenly cooling the mixture by pouring it upon a surface sufficiently cold to prevent substantial crystallization.

7. The method of preparing a compound particularly applicable for the treatment of meat which comprises making a solution of sodium nitrite and sodium nitrate in the respective proportions of 1½ to 1 part by weight, evaporating the liquid, melting the residue, and cooling the mixture with sufficient rapidity to prevent substantial crystallization.

8. The method of making a salt mass for curing meats which comprises making a solution including soluble meat-curing nitrate and soluble meat-curing nitrite, and removing water by evaporation at a temperature where residual material forms a melted mass containing said nitrite and nitrate, and quickly cooling the mass whereby to prevent substantial separation of the nitrite and nitrate by crystallization, thereby forming a solid mass in which nitrite and nitrate are united in a firm physical union.

9. The method of combining meat-curing nitrite and meat-curing nitrate of alkali metal which comprises dissolving the two salts in water, flash drying a thin body of the solution at a temperature which drives off water and effects fusion of the said salts with a small residual water content, and quickly cooling the fusion to prevent fractional crystallization.

10. The method of combining meat-curing nitrite and meat-curing nitrate of alkali metal which comprises combining the two materials, heating the mixture containing them to a temperature capable of fusing them together from said mixture, and then without delay sufficient to alter the proportions, cooling the mass quickly to avoid fractional crystallization.

ENOCH L. GRIFFITH.